US007422615B2

(12) United States Patent
Kim

(10) Patent No.: US 7,422,615 B2
(45) Date of Patent: Sep. 9, 2008

(54) CYCLONE DUST-SEPARATING APPARATUS

(75) Inventor: Tak-Soo Kim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 571 days.

(21) Appl. No.: 11/128,662

(22) Filed: May 13, 2005

(65) Prior Publication Data

US 2006/0156699 A1 Jul. 20, 2006

(30) Foreign Application Priority Data

Jan. 14, 2005 (KR) ...................... 10-2005-0003688

(51) Int. Cl.
*B01D 45/12* (2006.01)

(52) U.S. Cl. ............................ 55/426; 55/429; 55/457; 55/459.1; 55/DIG. 3

(58) Field of Classification Search .................. 55/426, 55/429, 459.1, 457, 337, DIG. 3; 15/350, 15/353

See application file for complete search history.

(56) References Cited

U.S. PATENT DOCUMENTS

| | | | | |
|---|---|---|---|---|
| 6,003,196 | A | 12/1999 | Wright et al. | 15/353 |
| 6,531,066 | B1 | 3/2003 | Saunders | 210/787 |
| 6,736,873 | B2 * | 5/2004 | Conrad et al. | 55/459.1 |
| 7,247,181 | B2 * | 7/2007 | Hansen et al. | 55/337 |
| 2007/0011998 | A1 * | 1/2007 | Yoo et al. | 55/337 |
| 2007/0084161 | A1 * | 4/2007 | Yoo | 55/345 |

FOREIGN PATENT DOCUMENTS

| | | | |
|---|---|---|---|
| EP | 0885585 | A1 | 6/1997 |
| FR | 2812183 | A1 | 11/2000 |
| JP | 04-28811 | | 10/1992 |
| JP | 2002-051947 | | 2/2002 |
| JP | 2002-143052 | | 5/2002 |
| JP | 2003-112082 | | 4/2003 |
| JP | 2003-153840 | | 5/2003 |
| JP | 2003-310505 | | 11/2003 |
| KR | 10-2002-0009768 | | 2/2002 |
| KR | 1020020009768 | | 2/2002 |
| KR | 10-2003-0094868 | | 12/2003 |
| KR | 1020030094868 | | 12/2003 |
| WO | WO 00/74548 | | 12/2000 |

OTHER PUBLICATIONS

EP Search Report dated Apr. 13, 2007.

Examination Report dated Aug. 10, 2006 issued from the Australian Patent Office with respect to Australian Patent Application No. 2005203524 filed on Aug. 8, 2005.

Office Action dated Dec. 11, 2007 corresponding to Japanese Patent Application No. 2005-144642.

* cited by examiner

*Primary Examiner*—Robert A Hopkins
(74) *Attorney, Agent, or Firm*—Ohlandt, Greeley, Ruggiero & Perle, LLP.

(57) ABSTRACT

A cyclone dust-separating apparatus including a cyclone body having a cyclone chamber and a dirt-collecting chamber enclosing an outer circumference of the cyclone chamber, an upper cover disposed on an upper end of the cyclone body to form a connection passage between the cyclone chamber and the dirt-collecting chamber, and a backflow prevention protrusion formed on an inner wall of the upper cover, for preventing dirt collected in the dirt-collecting chamber from flowing back to the cyclone chamber.

19 Claims, 5 Drawing Sheets

CYCLONE DUST-SEPARATING APPARATUS

CROSS-REFERENCE TO RELATED APPLICATIONS

This application claims the benefit under 35 U.S.C. § 119 (a) of Korean Patent Application No. 2005-03688, filed on Jan. 14, 2005, in the Korean Intellectual Property Office, the disclosure of which is incorporated herein by reference in its entirety.

BACKGROUND OF THE INVENTION

1. Field of the Invention

The present invention relates to a cyclone dust-separating apparatus employed in a vacuum cleaner, for centrifugally separating dust from drawn-in air.

2. Description of the Related Art

An early model cyclone dust-separating apparatus, which is disclosed in U.S. Pat. No. 6,003,196, performs separating and collecting operations at the same place. In this case, collected dust may be scatted or flow back to a discharge pipe by a cyclone air current, which causes deterioration of separation efficiency. Scattered dust clogs a filter such as a discharge filter, and this becomes more problematic when a vacuum cleaner is overturned and thus dust collected therein spills.

In order to solve the above problems, a cyclone dust-separating apparatus was suggested in Korean Patent Publication No. 2002-0009768 filed by the same assignee. The cyclone dust-separating apparatus includes a cylindrical cyclone body, a dirt-collecting receptacle enclosing an outer circumference of the cyclone body and having a partition for restricting dust movement, and a cover for covering an upper portion of the cyclone body and having an air inflow port and an air discharge port, and it is compact-sized to be applied in a canister type cleaner.

However, when the canister type cleaner employing the cyclone dust-separating apparatus as constructed above is suddenly overturned during cleaning operation, dust remaining in the cyclone body spills out to the cover having the air discharge port and thus escapes from the cyclone dust-separating apparatus through the air discharge port.

Also, since the cover has the air inflow port and the air discharge port formed therein, its structure is complicated.

SUMMARY OF THE INVENTION

The present invention has been developed in order to solve the above problems in the related art. Accordingly, an aspect of the present invention is to provide a cyclone dust-separating apparatus capable of preventing backflow of collected dust when a vacuum cleaner is overturned.

Another aspect of the present invention is to provide a cyclone dust-separating apparatus having a cover of a simplified construction.

The above aspects are achieved by providing a cyclone dust-separating apparatus including a cyclone body having a cyclone chamber and a dirt-collecting chamber enclosing an outer circumference of the cyclone chamber, an upper cover disposed on an upper end of the cyclone body to form a connection passage between the cyclone chamber and the dirt-collecting chamber, and a backflow prevention protrusion formed on an inner wall of the upper cover, for preventing dirt collected in the dirt-collecting chamber from flowing back to the cyclone chamber.

The cyclone dust-separating apparatus may further include an air discharge pipe disposed on a bottom of the cyclone body, an air inflow pipe disposed in a lower portion of the cyclone body to penetrate through an inner wall and an outer wall of the cyclone body, and a guide disposed in the cyclone chamber to guide air drawn in through the air inflow pipe.

The backflow prevention protrusion, the shape of which resembles a cylinder, may have a larger diameter D2 than a diameter D1 of the cyclone chamber. A height H3 of the backflow prevention protrusion may be smaller than a height H4 of the connection passage.

The above aspects are also achieved by providing a cyclone dust-separating apparatus having a cyclone body including an circular inner wall, an outer wall spaced from the inner wall by a predetermined distance, a bottom connecting the inner wall and the outer wall, and an upper wall connecting with an upper end of the outer wall, an air inflow pipe penetrating through the outer wall and the inner wall of the cyclone body, an air discharge pipe penetrating through the bottom of the cyclone body, and a backflow prevention protrusion protruding downward from a lower surface of the upper wall. An upper end of the inner wall and the lower surface of the upper wall are spaced from each other by a predetermined distance. The backflow prevention protrusion may have a larger diameter than that of the circular inner wall.

BRIEF DESCRIPTION OF THE DRAWINGS

The above aspects and other advantages of the present invention become more apparent by describing a preferred embodiment of the present invention with reference to the accompanying drawings, in which.

In the drawings, it should be understood that like reference numerals refer to like features and structures.

DETAILED DESCRIPTION OF A PREFERRED EMBODIMENT

Hereinafter, a cyclone dust-separating apparatus according to an embodiment of the present invention will now be described in greater detail with reference to the accompanying drawings.

Figure 1:
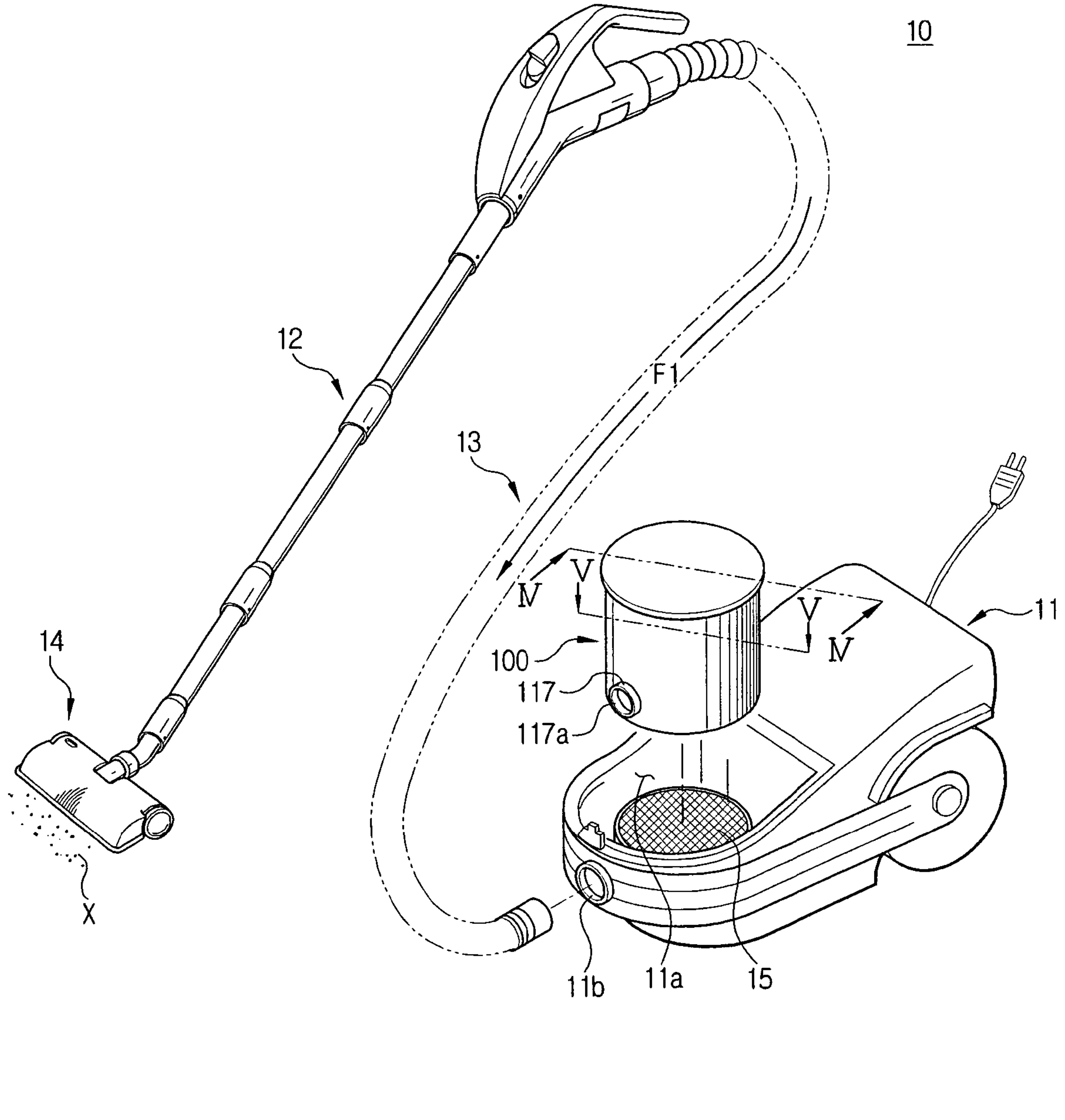
FIG. 1 is a view showing a vacuum cleaner according to an exemplary embodiment of the present invention.

FIG. 1 illustrates a vacuum cleaner 10 employing a cyclone dust-separating apparatus 100 according to an exemplary embodiment of the present invention. The vacuum cleaner 10 has a cleaner body 11, an extension pipe 12, a flexible hose 13 (illustrated in phantom), a suction brush 14 connected to the cleaner body 11 through the extension pipe 12 and the flexible hose 13, and the cyclone dust-separating apparatus 100 removably mounted in the cleaner body 11.

A connection hole 11*b* is formed on a front surface of the cleaner body 11 to fluidly communicate with an air suction port 117*a* of the cyclone dust-separating apparatus 100. During assembly of vacuum cleaner 10, the flexible hose 13 is inserted into the connection hole 11*b*.

The cleaner body 11 is provided with a dust-collecting chamber 11*a* in which the cyclone dust-separating apparatus 100 is seated. The cleaner body 11 is also provided with an air discharge filter 15 on which the cyclone dust-separating apparatus 100 is placed when disposed in the dust-collecting chamber 11*a*. An air discharge port 112*a* (see FIG. 4) of the cyclone dust-separating apparatus 100 fluidly communicates with a suction force source (not shown) disposed in the cleaner body 11 through the air discharge filter 15.

Figure 2:
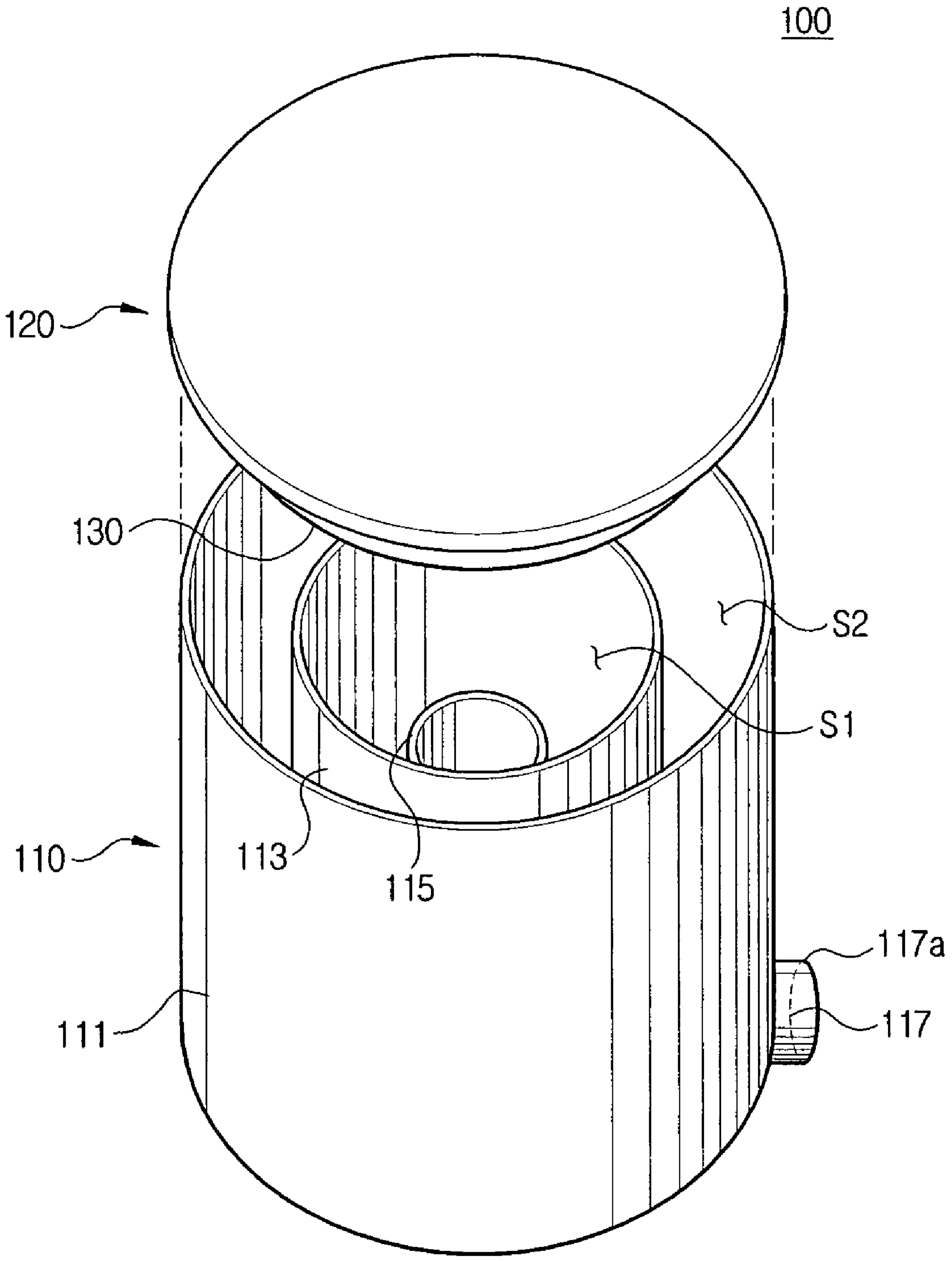
FIG. 2 is an exploded perspective view showing a cyclone dust-separating apparatus of FIG. 1.

Referring now to FIG. 2, the cyclone dust-separating apparatus 100 has a cyclone body 110, an upper cover 120, and a backflow prevention protrusion 130.

The cyclone body 110 is a cylindrical vessel having a cyclone chamber S1 formed in a center thereof and a dirt-collecting chamber S2 formed along a circumference thereof. For this, the cyclone body 110 includes an outer wall 111, a bottom 112 (see FIG. 4) and an inner wall 113.

Figure 3:
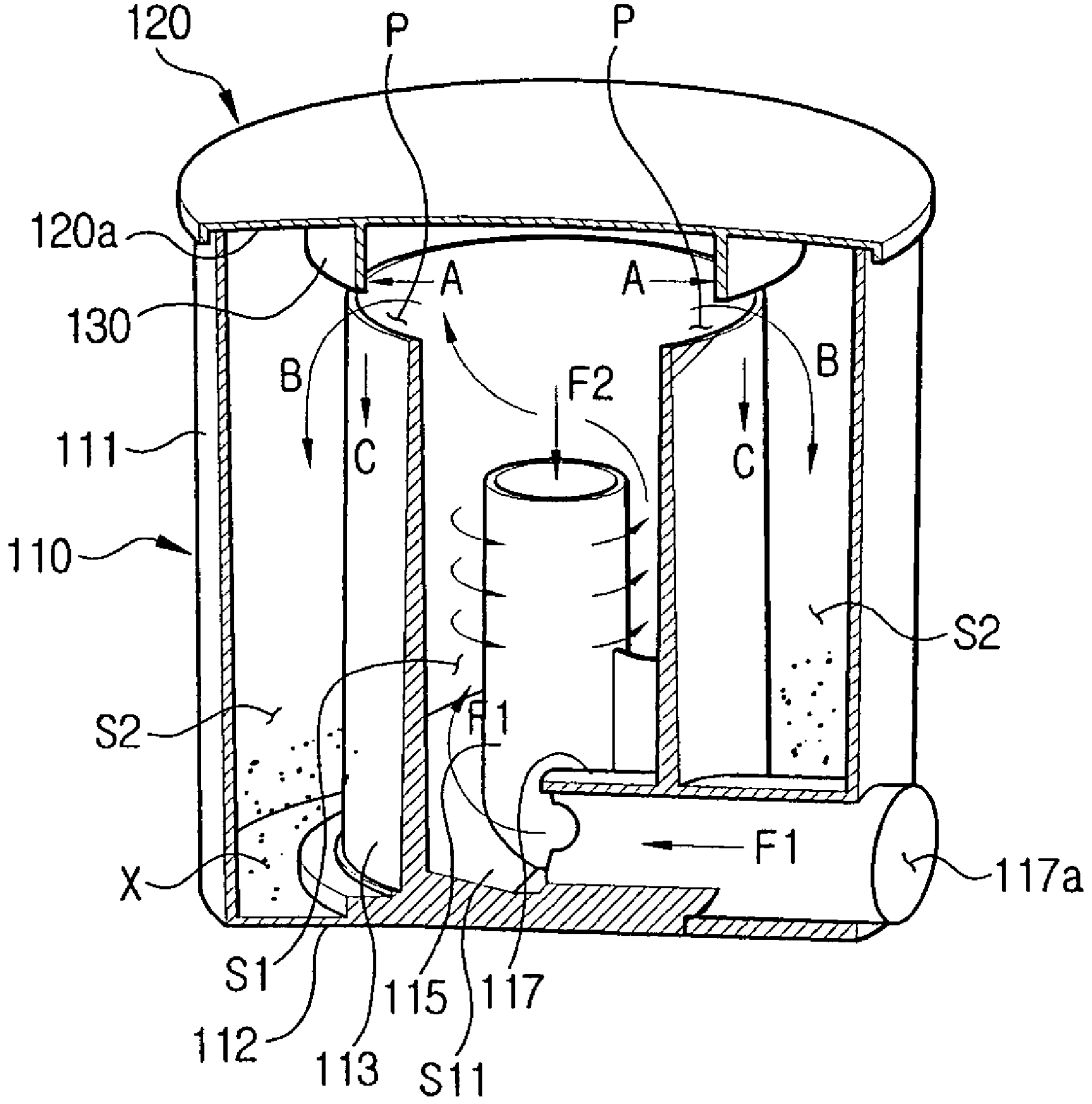
FIG. 3 is a partial section view of FIG. 1.
Figure 4:
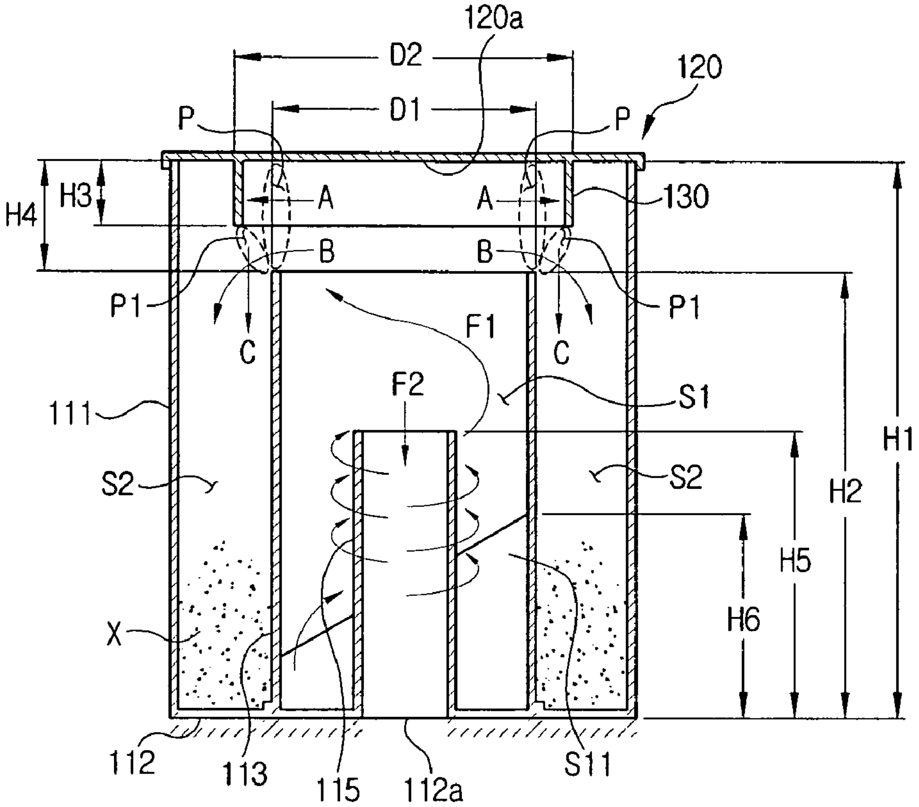
FIG. 4 is a view taken along line IV-IV of FIG. 1.

Referring to FIGS. 3 and 4, the cyclone chamber S1 is formed by the inner wall 113 in cooperation with the bottom 112, and dust "X" is centrifugally separated from drawn-in air in the cyclone chamber S1. A height H2 of the inner wall 113 is smaller than a height H1 of the outer wall 111 in order to form a connection passage P having a height H4. The connection passage P depicts a space formed by between inner wall 113 and upper cover 120 as illustrated in FIG. 4 by the dotted lines.

A guide S11 is disposed on the bottom 112 of the cyclone chamber S1. The guide S11 encloses an air discharge pipe 115 in a spiral direction so that its height gradually increases from the bottom 112 to a height H6. Due to the presence of the guide S11, the dust-laden air that is drawn in from an air inflow pipe 117 can maintain its swirling force and is guided to the upper cover 120. In another embodiment, the guide S11 is formed integrally with the bottom 112 of the cyclone body 110, and if necessary, the guide S11 can be fabricated separately from cyclone body 110 and then welded or adhered to the bottom 112.

Figure 5:
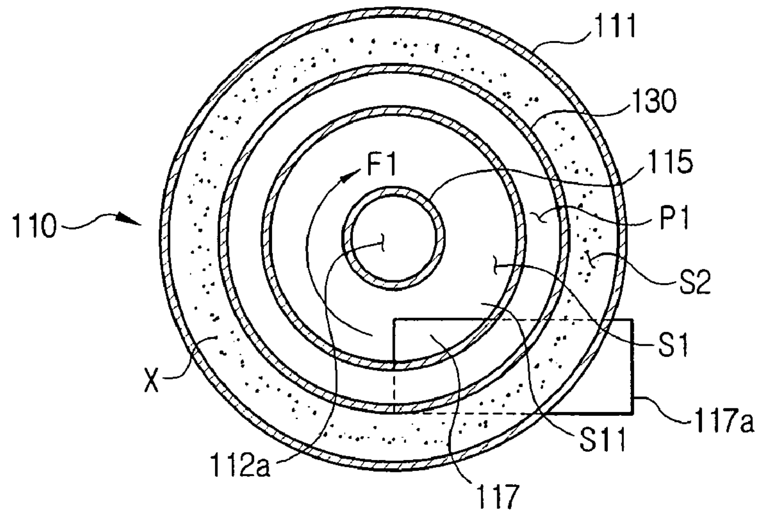
FIG. 5 is a view taken along line V-V of FIG. 1.

Referring to FIG. 3, the air inflow pipe 117 is disposed on a lower portion of the cyclone body 110, penetrating through the outer wall 111 and the inner wall 113. More specifically, the air inflow pipe 117 is disposed on a side of the cyclone chamber S1 as shown in FIG. 5 to apply a centrifugal force to the dust-laden air, and it takes various formations such as rectangle and triangle. The dust-laden air that has been drawn in through the air suction port 117*a* and the air inflow pipe 117 is guided to the cyclone chamber S1.

Referring to FIG. 4, the air discharge port 112*a* is formed in a center of the bottom 112 of the cyclone chamber S1, and an air discharge pipe 115 having a predetermined height H5 is welded and adhered to the air discharge port 112*a*.

The height H5 of the air discharge pipe 115 is set such that the dust-laden air flowing from the air inflow pipe 117 is not directly discharged and filtered air is smoothly discharged. According to an experiment, the height H5 of the air discharge pipe 115 is obtained by the following equation:

$$H5=H6+(H2-H6)*1/3 \quad \text{[Equation]}$$

That is, a value obtained by subtracting the height H6 of the guide S11 from the height H2 of the inner wall 113 is multiplied by ⅓. Then, the height H6 of the guide S11 added to the height (H2−H6)*⅓ is a preferred height H5 of the air discharge pipe 115. The coefficient to be multiplied is not limited to ⅓, and may be from approximately ⅓ to ½.

The air discharge pipe 115 may be formed integrally with the bottom 112 of the cyclone chamber S1 by molding and may have various shapes such as circular, rectangular, and triangular. The air from which dust is separated through the air discharge port 112*a* and the air discharge pipe 115 is discharged from the cyclone dust-separating apparatus 100 in the arrow direction F2.

Referring to FIGS. 4 and 5, the dirt-collecting chamber S2 is a space that encloses the outer circumference of the cyclone chamber S1, for collecting therein the dust X. For this, the dirt-collecting chamber S2 is enclosed by the inner wall 113, the outer wall 111, and the bottom 112.

Figure 7:
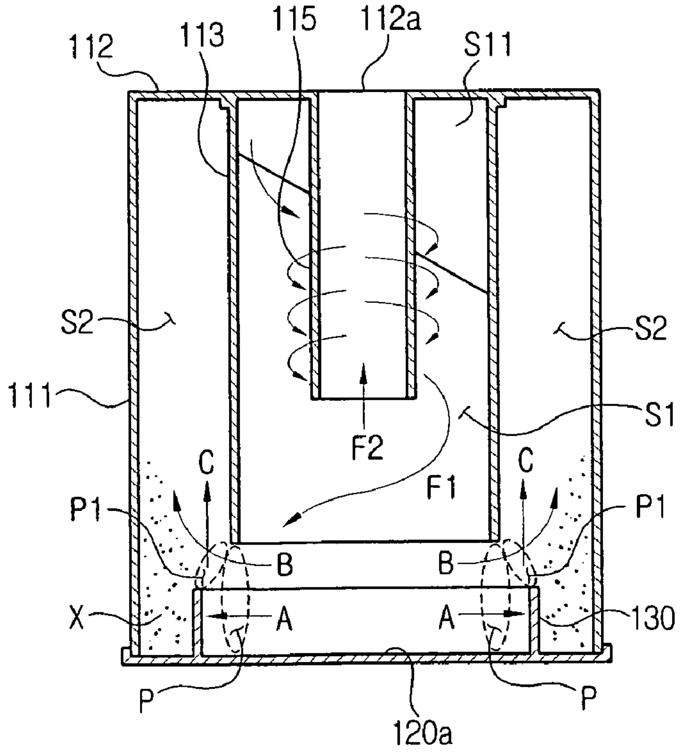
FIG. 7 is a view showing the cyclone dust-separating apparatus of FIG. 1 when being overturned.

As described above, since the cyclone S1 and the dirt-collecting chamber S2 are partitioned off from each other, operations for separating the dust X from the drawn-in air and collecting the dust X are performed in different places. Accordingly, when the vacuum cleaner 10 is overturned and the dust X spills out to a lower surface of the upper cover 120 as shown in FIG. 7, the dust X collected in the dirt-collecting chamber S2 does not flow back to the cyclone chamber S1. Also, the dust X is prevented from being scattered.

Since the air suction port 117*a* and the air discharge port 112*a* are respectively formed on the outer wall 111 and the bottom 112 of the cyclone body 110, the structure of the upper cover 120 is simplified.

When the vacuum cleaner 10 is overturned, dust remaining in the cyclone chamber S1 is prevented from being discharged to the air discharge port 112*a* through the air discharge pipe 115 because the air discharge pipe 115 is located on the bottom 112 (i.e., the side opposite upper cover 120).

Figure 6:
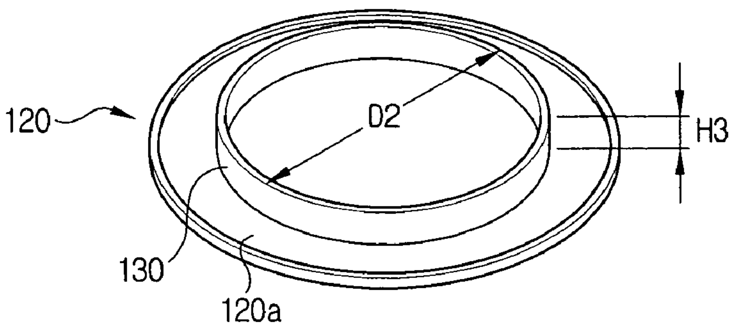
FIG. 6 is a perspective view showing an upper cover and a backflow prevention protrusion of FIG. 2.

Referring to FIGS. 4 to 6, the upper cover 120, the shape of which resembles a circle, covers the upper portion of the cyclone body 110. The connection passage P is not formed until the upper cover covers the upper portion of the cyclone body 110.

In another embodiment, instead of the upper cover 120, a cover (not shown) can be connected to an upper portion of the outer wall 111 and not detachable is provided to cover the upper portion of the cyclone body 110. In this case, the dust collected in the dirt-collecting chamber S2 is removed by an openable and closable bottom 112.

The backflow prevention protrusion 130, the shape of which resembles a cylinder, protrudes from a lower surface 102*a* of the upper cover 120 and shields a part of the connection passage P. A height H3 of the backflow prevention protrusion 130 is smaller than the height H4 of the connection passage P such that the backflow prevention protrusion 130 partially shields the connection passage P, and thereby forms a loop-shaped auxiliary passage P1.

Dust X that has been centrifugally separated in the cyclone chamber S1 drops down to the dirt-collecting chamber S2 through the auxiliary passage P1. For reference, a space formed by the auxiliary passage P1 is depicted in FIG. 4 by the dotted lines.

The backflow prevention protrusion 130 has a larger inner diameter D2 than an inner diameter D1 of the cyclone chamber S1. Accordingly, dust X that has been centrifugally separated from the drawn-in air collides with the backflow prevention protrusion 130 in the arrow direction A, and then drops down in a vertical direction i.e. in the arrow direction C through the auxiliary passage P1 to the dirt-collecting chamber S1, not the cyclone chamber S1.

Also, air current carrying the dust X collides with the backflow prevention protrusion 130 in the arrow direction A, and then descends in the vertical direction i.e. in the arrow direction C to the dirt-collecting chamber S2, not the cyclone chamber S1. Therefore, when the vacuum cleaner 10 is overturned during cleaning operation as shown in FIG. 7, the vertically descending air current prevents the dust X collected in the dirt-collecting chamber S2 from flowing back to the cyclone chamber S1.

Also, collected dust X can be prevented from being scattered. That is, dust X collected in the dirt-collecting chamber S2 tries to ascend to the upper cover 120 but fails to do that due to the vertically descending air current and thus return to the dirt-collecting chamber S2. The dust X and the air current descend at the same time or in sequence.

More specifically, when the vacuum cleaner is overturned as shown in FIG. 7, the dust X collected in the dirt-collecting chamber S2 can be prevented from flowing back to the cyclone chamber S1 in first operation because the cyclone chamber S1 and the dirt-collecting chamber S2 are partitioned off from each other, and also prevented from flowing back to the cyclone chamber S1 through the auxiliary passage P1 in second operation by the vertically descending air current formed by the backflow prevention protrusion 130.

Since the air discharge pipe 115 is located on the bottom 112, dust remaining in the cyclone chamber S1 is prevented from being discharged to the air discharge port 112*a* through the air discharge pipe 115 when the vacuum cleaner is overturned.

Hereinafter, operation of the cyclone dust-separating apparatus 100 having the above construction will now be described.

Referring to FIG. 1, when the vacuum cleaner 10 is driven, dust X is drawn in through the suction brush 14 from a to-be-cleaned surface by a suction force generated by the suction force source (not shown). The drawn-in dust X flows into the cyclone dust-separating apparatus in the arrow direction F1 through the extension pipe 12, the flexible hose 13, and the air suction port 117*a* fluidly communicating with the connection hole 11*b* of the cleaner body 11.

Referring to FIG. 3, the drawn-in dust X flows into the cyclone chamber S1 through the air inflow pipe 117. At this time, a centrifugal force is applied to the dust X because the air inflow pipe 117 is located on a side of the bottom 112 of the cyclone chamber S1. Also, due to presence of the guide S11 disposed on the bottom 112 of the cyclone chamber S1, enclosing the air discharge pipe 115 in a spiral direction and gradually increasing in height, the dust maintains the centrifugal force and is guided to the upper cover 120.

Referring to FIG. 4, the dust X is centrifugally separated in the cyclone chamber S1 through the above process and pops up to the connection passage P. Then, the dust X moves in the arrow direction A, collides with the backflow prevention protrusion 130, and then drops down to the dirt-collecting chamber S2 through the auxiliary passage P1 of the connection passage P in the arrow direction C i.e. in the vertical direction. Alternatively, the dust X directly drops down to the dirt-collecting chamber S2 through the auxiliary passage P1 of the connection passage P without colliding with the backflow prevention protrusion 130.

Concurrently and/or sequentially, air current carrying the separated dust X collides with the backflow prevention protrusion 130 in the arrow direction A and drops down to the dirt-collecting chamber S2 through the auxiliary passage P1 of the connection passage P in the arrow direction C i.e. in the vertical direction. The descending air current inhibits the dust X collected in the dirt-collecting chamber S2 from ascending.

After that, filtered air is discharged from the cyclone dust-separating apparatus 100 through the air discharge pipe 115 and the air discharge port 112*a* in the arrow direction F2, and then is discharged from the vacuum cleaner 10 (see FIG. 1) through the air discharge filter 15 (see FIG. 1) and the suction force source (not shown).

The cyclone dust-separating apparatus 100 according to the embodiment of the present invention has advantages as follows.

First, the backflow prevention protrusion 130, and the cyclone chamber S1 and the dirt-collecting chamber S2 which are partitioned off from each other prevent the dust X collected in the dirt-collecting chamber S2 from being spattered and flowing back to the cyclone chamber S1. Accordingly, the air discharge filter 15 can be prevented from being clogged by the dust X.

Second, since the air discharge pipe 115 is located on the bottom 112, dust remaining in the cyclone chamber S1 is prevented from being discharged to the air discharge port 112*a* through the air discharge pipe 115 when the vacuum cleaner 10 is overturned. Accordingly, the air discharge filter 15 can be prevented from being clogged by the dust when the vacuum cleaner 10 is overturned.

Third, since the air suction port 17*a* is formed on the outer wall 111 of the cyclone body 110 and the air discharge port 115 is formed on the bottom 112, the structure of the upper cover is simplified. Also, collected dust X can be removed by simply opening the upper cover.

The foregoing embodiment and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A cyclone dust-separating apparatus comprising:

a cyclone body having a cyclone chamber and a dirt-collecting chamber enclosing an outer circumference of the cyclone chamber;

an upper cover disposed on an upper end of the cyclone body to form a connection passage between the cyclone chamber and the dirt-collecting chamber; and a backflow prevention protrusion formed on an inner wall of the upper cover, the backflow protrusion preventing dirt collected in the dirt-collecting chamber from flowing back to the cyclone chamber.

2. The cyclone dust-separating apparatus as claimed in claim 1, further comprising:

an air discharge pipe disposed on a bottom of the cyclone body;

an air inflow pipe disposed in a lower portion of the cyclone body to penetrate through an inner wall and an outer wall of the cyclone body; and a guide disposed in the cyclone chamber to guide air drawn in through the air inflow pipe.

3. The cyclone dust-separating apparatus as claimed in claim 2, wherein the backflow prevention protrusion, the shape of which resembles a cylinder, has a larger diameter D2 than a diameter Dl of the cyclone chamber.

4. The cyclone dust-separating apparatus as claimed in claim 3, wherein a height H3 of the backflow prevention protrusion is smaller than a height H4 of the connection passage.

5. A cyclone dust-separating apparatus comprising:

a cyclone body including a circular inner wall, an outer wall spaced from the inner wall by a predetermined distance, a bottom connecting the inner wall and the outer wall, and an upper wall connecting with an upper end of the outer wall;

an air inflow pipe penetrating through the outer wall and the inner wall of the cyclone body; and an air discharge pipe penetrating through the bottom of the cyclone body.

6. The cyclone dust-separating apparatus as claimed in claim 5, further comprising a backflow prevention protrusion protruding downward from a lower surface of the upper wall, wherein the backflow prevention protrusion has a larger diameter than that of the circular inner wall.

7. A cyclone dust-separating apparatus comprising:
a bottom wall;
an outer wall extending upward from said bottom wall to a first height;
an inner wall being spaced from said outer wall, said inner wall extending upward from said bottom wall to a second height, said second height being smaller than said first height;
an upper cover covering said inner and outer walls so that a connection passage having a fourth height is defined between said inner wall and said upper cover; and
a backflow prevention protrusion extending downward from said upper cover a third height, said third height being smaller than said fourth height.

8. The cyclone dust-separating apparatus as claimed in claim 7, wherein said inner wall has a first diameter and said backflow prevention protrusion has a second diameter, said second diameter being larger than said first diameter.

9. The cyclone dust-separating apparatus as claimed in claim 7, further comprising an air inflow pipe penetrating through said outer and inner walls.

10. The cyclone dust-separating apparatus as claimed in claim 7, further comprising an air discharge pipe penetrating through said bottom wall and extending upwards from said bottom wall a fifth height.

11. The cyclone dust-separating apparatus as claimed in claim 10, wherein said fifth height is smaller than said second height.

12. The cyclone dust-separating apparatus as claimed in claim 11, further comprising a spiral guide disposed on said bottom wall between said inner wall and said air discharge pipe.

13. The cyclone dust-separating apparatus as claimed in claim 12, wherein said spiral guide increases in height from said bottom wall to a sixth height.

14. The cyclone dust-separating apparatus as claimed in claim 13, wherein said fifth height is equal to the result of multiplying a coefficient by a value obtained by subtracting said sixth height from said second height and then adding said sixth height to said result.

15. The cyclone dust-separating apparatus as claimed in claim 14, wherein said coefficient is approximately ⅓ to ½.

16. A cyclone dust-separating apparatus comprising:
a cyclone body having an air inflow pipe, an air discharge pipe, a cyclone chamber, and a dirt-collecting chamber enclosing an outer circumference of the cyclone chamber; and
an upper cover disposed on an upper end of the cyclone body to form a connection passage between the cyclone chamber and the dirt-collecting chamber,
wherein the air inflow pipe and the air discharge pipe are formed on a lower part of the cyclone body such that dirt is prevented from flowing back through the air discharge pipe when the cyclone body is tilted over.

17. The cyclone dust-separating apparatus as claimed in claim 16, wherein the air inflow pipe is formed on a lower side of the cyclone body, and penetrating through the dirt-collecting chamber to connect to the cyclone chamber; and,
the air discharge pipe is formed on a lower side of the cyclone body, and protruding into the cyclone chamber.

18. The cyclone dust-separating apparatus as claimed in claim 17, further comprising a guide disposed in the cyclone chamber to upwardly guide air drawn in through the air inflow pipe.

19. A cyclone dust-separating apparatus, comprising:
a cyclone chamber in which air is drawn and dirt is separated from the drawn air by centrifugal force;
a dirt-collecting chamber enclosing an outer circumference of the cyclone chamber;
a connection passage formed on an upper end of the cyclone chamber, and connecting between the cyclone chamber and the dirt-collecting chamber, wherein external air is drawn through a lower side of the cyclone body and ascended inside the cyclone chamber in a whirling current, shedding out dirt, the dirt separated from the air is discharged through the connection passage and stored in the dirt-collecting chamber, and clean air is discharged through a center of a bottom of the cyclone chamber such that dirt of the dirt-collecting chamber is prevented from discharging out when the cyclone body is tilted over; and
a backflow prevention member provided to an upper end of the dirt-collecting chamber.

* * * * *